(12) United States Patent
Di Lallo

(10) Patent No.: US 9,918,429 B1
(45) Date of Patent: Mar. 20, 2018

(54) ERGONOMIC WEED TRIMMER

(71) Applicant: John T. Di Lallo, Davie, FL (US)

(72) Inventor: John T. Di Lallo, Davie, FL (US)

( * ) Notice: Subject to any disclaimer, the term of this patent is extended or adjusted under 35 U.S.C. 154(b) by 223 days.

(21) Appl. No.: 13/888,501

(22) Filed: May 7, 2013

(51) Int. Cl.
*A01B 1/00* (2006.01)
*B25G 1/00* (2006.01)
*A01D 34/90* (2006.01)
*A01D 34/00* (2006.01)
*A01B 1/02* (2006.01)

(52) U.S. Cl.
CPC ............ *A01D 34/902* (2013.01); *A01B 1/026* (2013.01); *A01D 34/001* (2013.01); *B25G 1/00* (2013.01)

(58) Field of Classification Search
CPC . A01B 1/026; B25G 1/00; B25G 1/10; A01D 34/902; A01D 34/001
USPC ..... 30/312, 522, 514, 517; 16/426, DIG. 25; 56/295; 294/58
See application file for complete search history.

(56) References Cited

U.S. PATENT DOCUMENTS

| | | | | |
|---|---|---|---|---|
| 911,291 | A * | 2/1909 | Byor | B25G 1/00 294/58 |
| 3,351,235 | A | 11/1967 | Paton | |
| D242,984 | S * | 1/1977 | Petty | D8/303 |
| 4,031,775 | A * | 6/1977 | Petty | B62K 21/26 16/421 |
| 4,264,096 | A * | 4/1981 | Barnett | B25G 1/00 294/58 |
| RE32,266 | E * | 10/1986 | Tuggle | A01D 34/84 172/141 |
| 4,794,667 | A | 1/1989 | Nelson et al. | |
| 4,838,465 | A * | 6/1989 | Metzger | E04G 21/04 222/526 |
| 5,065,475 | A * | 11/1991 | Watt | A01B 1/22 15/145 |
| D362,100 | S * | 9/1995 | McMurdo | D12/179 |
| 5,474,350 | A * | 12/1995 | Gauthier | A01B 1/00 16/426 |
| 5,496,085 | A * | 3/1996 | Middleton | A01B 1/026 16/426 |
| 5,499,852 | A * | 3/1996 | Seigendall | 294/58 |
| D380,368 | S * | 7/1997 | Kort | D8/107 |
| 5,921,600 | A * | 7/1999 | Lucas | A01B 1/026 294/58 |
| 6,258,636 | B1 | 7/2001 | Johnson et al. | |
| 7,014,232 | B2 | 3/2006 | Bosa | |
| 7,134,208 | B2 | 11/2006 | Wilkinson et al. | |
| 7,665,489 | B1 * | 2/2010 | Smith | 141/108 |
| 9,333,639 | B2 * | 5/2016 | Thresher | E01H 5/02 |
| 9,775,272 | B1 * | 10/2017 | Gilbert | A01B 1/026 |
| 2003/0126749 | A1 * | 7/2003 | Sanders | 30/276 |
| 2004/0075286 | A1 * | 4/2004 | Skowron | 294/58 |
| 2011/0173778 | A1 | 7/2011 | Wales | |

* cited by examiner

*Primary Examiner* — Laura M Lee
(74) *Attorney, Agent, or Firm* — Robert C. Montgomery; Montgomery Patent & Design

(57) ABSTRACT

An ergonomic trimmer handle that is attachable along the main shaft housing of a grass trimmer The trimmer handle includes a lateral bar that provides ease of handling and operational support that reduces the pain and fatigue associated with long term usage of a grass trimmer The trimmer handle includes an ergonomic hand grip and universal clamping plates for attaching the trimmer handle to a trimmer

17 Claims, 2 Drawing Sheets

ERGONOMIC WEED TRIMMER

RELATED APPLICATIONS

There are no current co-pending applications.

FIELD OF THE INVENTION

The presently disclosed subject matter is directed to handheld gardening tools. More particularly, the present invention is directed to handles for grass trimmers.

BACKGROUND OF THE INVENTION

Americans spend countless hours maintaining and beautifying their lawns and landscape. A well-manicured, healthy lawn with attractive plants and well-maintained flowers, shrubs, bushes, and trees increases a property's value and improves the overall aesthetic appearance of the property. Not only homeowners, but those that manage commercial properties know well the importance of a beautiful lawn.

When maintaining a lawn there are a number of tasks that must be performed, such as mowing, trimming, seeding, feeding, aerating, planting, and watering. There is a wide variety of power equipment to make such tasks easier and more productive. One (1) of the most common pieces of such equipment is the string-type grass trimmer Grass trimmers are widely used to trim grass and/or weeds near fences, buildings, sidewalks, etc. Such grass trimmers are used by a variety of people that range from homeowners to highway maintenance departments that trim along the sides of highways.

Grass trimmers do admirable jobs. They are typically equipped with both a main operating handle that covers the main shaft of the trimmer and a lower handle for holding and guiding the operation of the grass trimmer While the combination of a main handle and a lower handle works, as is well known by users of grass trimmers during use, the user's hands are forced into awkward angles which quickly becomes uncomfortable and painful, especially after long periods of use. The movement required to swing the grass trimmer side to side can place a great deal of stress on a user's back muscles.

Accordingly, there is a need for a device that can reduce the discomfort and pain associated with using a common grass trimmer Beneficially, such a device would enable easy movement and control of a grass trimmer while reducing the strain of a user's back, thus reducing the chances of repetitive stress injuries. An ergonomic design that enables a user to have more naturally positioned hands would be preferable. Ideally such a device would be useful on gas-, battery-, and/or electric-powered trimmers, would not require the use of specialized tools to install, and would be highly adjustable to fit different users such as different sizes and both left and right handed users. Ideally such a device could be easily moved from one (1) trimmer to another or, from one (1) trimmer to another piece of gardening equipment.

SUMMARY OF THE INVENTION

The principles of the present invention provide for a grass trimmer handle that reduces the discomfort and pain of using a common grass trimmer The grass trimmer handle enables easy movement and control of a grass trimmer, reducing the strain on a user's back and reducing the chances of repetitive stress injuries. The grass trimmer handle is useful on gas-, battery-, or electric-powered trimmers and does not require the use of specialized tools to install. It is highly adjustable and fits different sized users, both left and right handed. The grass trimmer handle can be moved from one (1) trimmer to another or from one (1) trimmer to another piece of equipment.

A trimmer handle that is in accord with the present invention includes an attachment rod having a proximate end and a distal end with first rod holes and second rod holes. The trimmer handle further includes a first clamp plate having a first proximate end, a first distal end, and a partial-cylindrical-shaped first clamping surface that is located between the first proximal end and the first distal end. Also included is a second clamp plate having a second proximate end, a second distal end, and a partial-cylindrical-shaped second clamping surface located between the second proximal end and the second distal end. The trimmer handle also includes a hand grip on the rod proximate end; a first fastener passing through the first rod holes, through the first clamp plate, and through the second clamp plate; and a second fastener passing through the second rod holes, through the first clamp plate, and through the second clamp plate. The first fastener and the second fastener attach the first clamp plate and the second clamp plate to the attachment rod while the third fastener attaches the first clamp plate to the second clamp plate.

The hand grip is beneficially press fit to the attachment rod and includes a finger relief groove. Preferably there is a hand guard at an end of the hand grip. The first clamp plate and the second clamp plate are beneficially mirror-imaged elements comprised of stamped metal and the first clamp plate includes a first clamp plate, partial-cylindrical-shaped clamping surface that is configured to clamp around a shaft housing of a trimmer One (1) or more of the fasteners may include a bolt, a washer, and a nut.

A grass trimmer handle that is in accord with the present invention includes an attachment rod having a rod proximate end and a rod distal end, with the distal end having a first pair of aligned rod holes and second pair of aligned rod holes. A first clamp plate having a first proximate end, a first distal end, and a partial-cylindrical-shaped first clamping surface and a second clamp plate having a second proximate end, a second distal end, and a partial-cylindrical-shaped second clamping surface attach to the attachment rod. Also included is a soft hand grip having a finger relief groove and which is press-fit to the rod proximate end. A first bolt passes through the first pair of aligned rod holes, first clamp plate, and clamp plate and a second bolt passes through the second pair of aligned rod holes, first clamp plate, and second clamp plate. The first bolt and second bolt attach the first clamp plate and the second clamp plate to the attachment rod.

The grass trimmer may include a hand guard while the first clamp plate and the second clamp plate may be mirror-imaged elements comprised of stamped metal.

A trimmer that is in accord with the present invention includes a shaft housing, an attachment rod having a rod proximate end and a rod distal end with first rod holes and second rod holes, a first clamp plate having a first proximate end attached to the attachment rod, a first distal end, and a partial-cylindrical-shaped first clamping surface disposed around the shaft housing; a second clamp plate having a second proximate end attached to the attachment rod, a second distal end, and a partial-cylindrical-shaped second clamping surface disposed around the shaft housing. The trimmer also includes a hand grip on the rod proximate end, a first fastener passing through the first rod holes and attaching the first clamp plate and the second clamp plate to the attachment rod, a second fastener passing through the second rod holes and attaching the first clamp plate and the second clamp plate to the attachment rod, and a third fastener attaching the first distal end to the second distal end.

Beneficially, the hand grip is press fit to the attachment rod and it includes at least one finger relief groove. Also beneficially there is a hand guard at an end of the hand grip. Preferably, the first clamp plate and the second clamp plate are mirror-imaged elements comprised of stamped metal, and the first fastener includes a bolt, a washer, and a nut. In practice, the trimmer can be a grass trimmer, gas powered, battery powered, or electric powered.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

- 10 trimmer handle
- 20 attachment rod
- 22 rod aperture
- 30 first clamp plate
- 32 first clamping surface
- 35 second clamp plate
- 37 second clamping surface
- 40 hand grip
- 42 finger relief
- 45 hand guard
- 75 fastener aperture
- 80 bolt
- 82 nut
- 84 washer
- 100 grass trimmer
- 105 shaft housing

DETAILED DESCRIPTION OF THE PREFERRED EMBODIMENT

Figure 1:
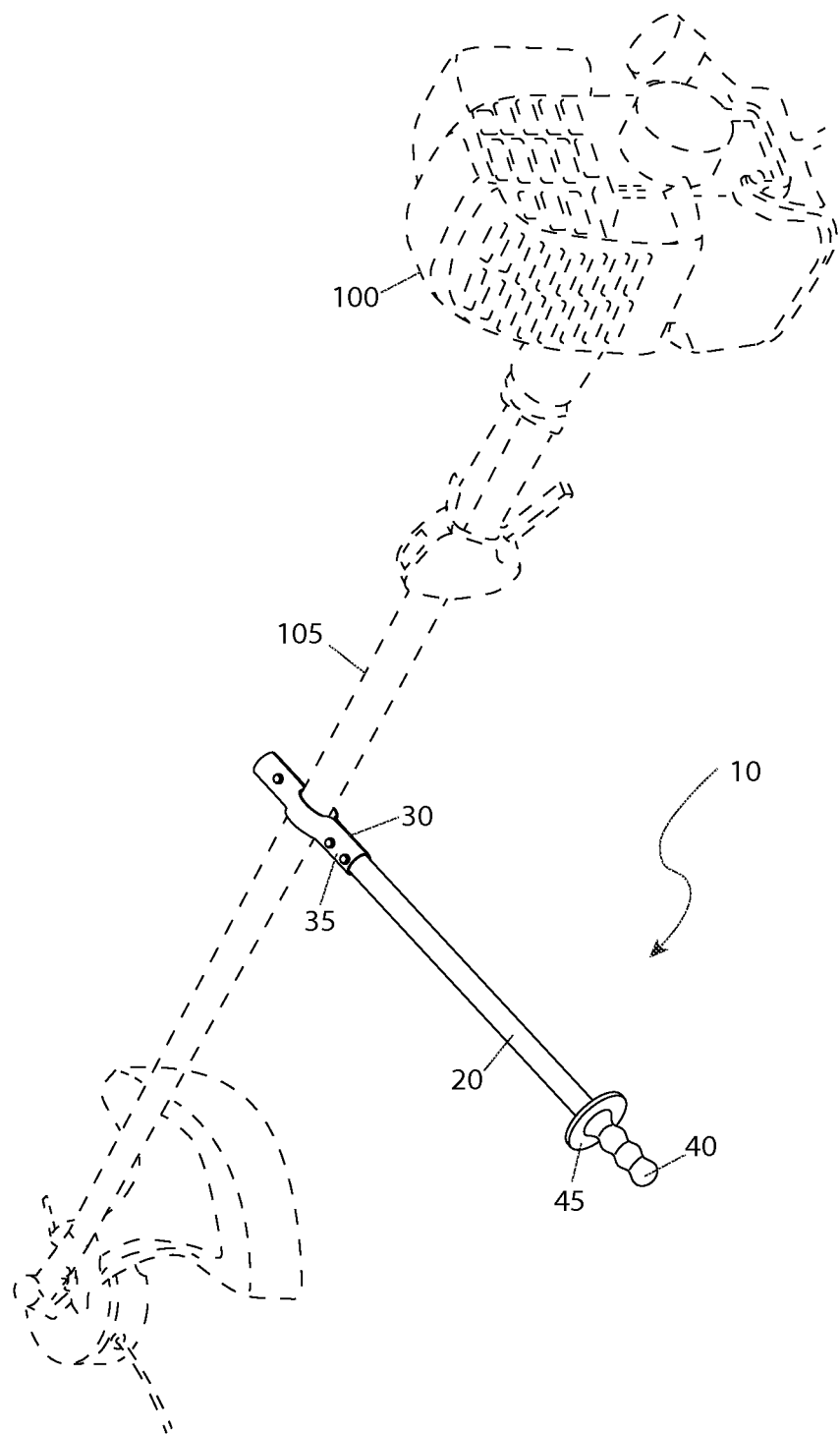
FIG. 1 is an environmental view of an ergonomic trimmer handle 10 that is in accord with a preferred embodiment of the present invention attached to a grass trimmer 100; and, FIG. 2 is an exploded view of the trimmer handle 10 shown in FIG. 1.
Figure 2:
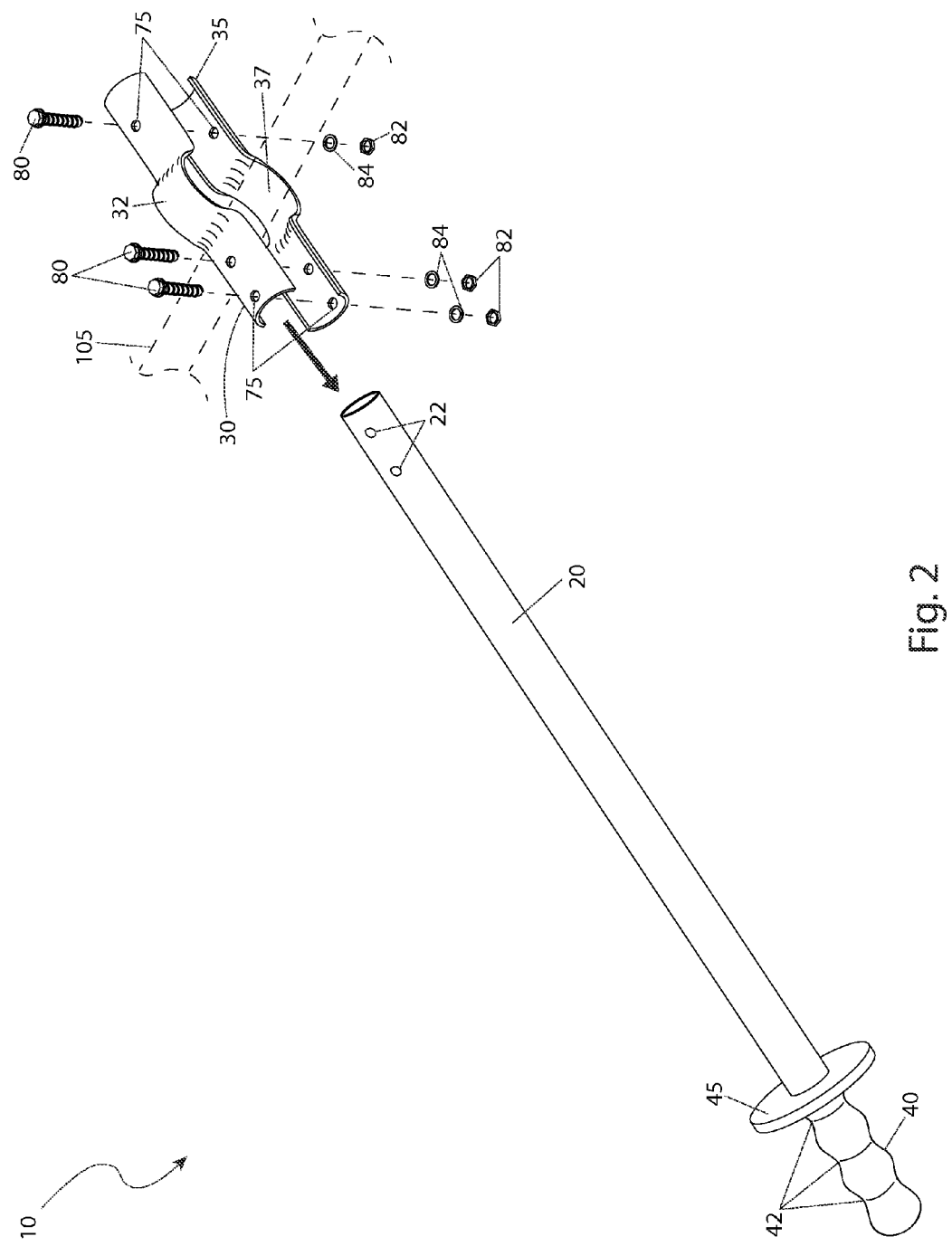

The best mode for carrying out the invention is presented in terms of its preferred embodiment, herein depicted within FIGS. 1 and 2. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

FIG. 1 presents an environmental view of an ergonomic trimmer handle 10 that is in accord with the present invention attached to a grass-trimmer 100. The trimmer handle 10 is an auxiliary, removable handle for the grass trimmer 100 which provides a user with a comfortable grip that enables easy manipulation of the grass trimmer 100. The trimmer handle 10 is particularly useful because it reduces the stress placed on the user and makes using the grass trimmer less tiring.

The trimmer handle 10 protrudes perpendicularly from the main shaft 105 of the grass trimmer 100. The trimmer handle 10 is both removable from and adjustable on the main shaft 105. The trimmer handle 10 provides a user with a more comfortable operating position that can reduce the pain and fatigue often associated with long term usage of a grass trimmer 100.

Referring now to both FIG.s 1 and 2, the trimmer handle 10 includes an attachment rod 20, a first clamp plate 30, a second clamp plate 35, and a hand grip 40. The trimmer handle 10 attaches to the shaft housing 105 of the grass trimmer 100 via the first clamp plate 30 and the second clamp plate 35. During installation, the distal end of the attachment rod 20 is loosely fastened (as described below) to the first clamp plate 30 and to the second clamp plate 35. The first clamp plate 30 and the second clamp plate 35 are then positioned on opposite sides of the shaft housing 105 of the grass trimmer 100 in a clam-shell manner. The first clamp plate 30 and the second clamp plate 35 are then tightly fastened together (also as described below) to encompass and clamp the shaft housing 105.

Beneficially, the first clamp plate 30 and the second clamp plate 35 are highly advantageous because they can be positioned almost anywhere along the shaft housing 105. Furthermore, they enable the shaft housing 105 to be rotated as desired relative to the trimmer handle 10 to provide a user with increased comfort. Thus, the first clamp plate 30 and the second clamp plate 35 enable a user to freely adjust the trimmer handle 10 relative to the shaft housing 105.

The attachment rod 20 extends outward approximately two feet (2 ft.). At the proximate end of the attachment rod is the hand grip 40. The hand grip 40 is a soft, ergonomically shaped hand grip preferably comprised of rubber or a similar material. The hand grip 40 is best affixed to the proximal end of the attachment rod 20 using a press fit. The hand grip 40 includes finger reliefs 42 and ends at its forward end in an integral hand guard 45. The finger reliefs 42 include a plurality of relief grooves for the comfort of the user. In addition, the hand guard 45 protrudes outward in a circle to provide hand protection to the user during grass trimming Referring now primarily to FIG. 1, the trimmer handle 10 allows the user to hold the shaft housing 105 with one (1) hand and the trimmer handle 10 with the other. This forms an ergonomic pivoting stance that can reduce excessive pressure on the user's back muscles. The clamping nature of the trimmer handle 10 also enables use of the trimmer handle 10 upon many different makes and models of existing grass trimmers 100. Furthermore, the trimmer handle 10 is well suited for incorporation as standard equipment on new grass trimmers 100.

Referring now primarily to FIG. 2, an exploded view of the trimmer handle 10, the attachment rod 20 comprises a length of a light-weight hollow or solid metal pipe or tubing. The attachment rod 20 includes two sets of aligned holes 22 near its distal end.

The first clamp plate 30 and the second clamp plate 35 are mirror-imaged elements comprised of stamped, elongated, generally concave, semi-flexible metal. Each clamp plate 30, 35 includes an intermediately positioned, partial-cylindrical-shaped clamping surface; respectively the first clamping surface 32 and the second clamping surface 37. The first clamp plate 30 and the second clamp plate 35 each include three holes 75. Those holes 75 align in pairs. The proximate ends of the first clamp plate 30 and the second clamp plate 35 form two pairs of aligned holes 75 that are configured to align with the holes 22 of the attachment rod 20. Their distal ends include the other pair of aligned holes 75.

The first clamping surface 32 and the second clamping surface 37 include concave shapes dimensioned and configured to clamp around the shaft housing 105. To attach the first clamp plate 30 and the second clamp plate 35 to the attachment rod 20 the concave shapes of the first clamp plate 30 and the second clamp plate 35 are fit around the attachment rod 20. Then the two (2) pairs of aligned holes 75 at the proximate ends of the first clamp plate 30 and the second clamp plate 35 are aligned with the holes 22 of the attachment rod 20. Two (2) bolts 80 are then passed through the aligned holes 22, washers 84 are installed on the two (2) bolts 80, and finally nuts 82 are threaded onto but not tightened on the two (2) bolts 80.

With the clamp plate 30 and the second clamp plate 35 lightly attached to the attachment rod 20 as described above the shaft housing 105 is fit between the first clamping surface 32 and the second clamping surface 37. A bolt 80 passes through the two (2) aligned holes 75 at the distal ends of the first clamp plate 30 and the second clamp plate 35. A washer 84 is installed on the bolt 80 and finally a nut 82 is threaded onto that bolt 80. All three (3) nuts 82 are then tightened onto their associated bolts 80. This firmly attaches the shaft housing 105.

Still referring primarily to FIG. 2, the first clamping surface 32 and the second clamping surface 37 include grass trimmer 100 and the trimmer handle 10 together.

It is envisioned that other styles and configurations of the present invention can be easily incorporated into the teachings of the present invention. While only one particular configuration is shown and described that is for purposes of clarity and disclosure and not by way of limitation of scope.

The preferred embodiment of the present invention can be utilized by the common user in a simple and effortless manner with little or no training. After initial purchase or acquisition of the trimmer handle 10, it would be installed and utilized as indicated in FIG. 1.

The method of utilizing the trimmer handle 10 may be achieved by performing the following steps: procuring the trimmer handle 10; attaching the device to an existing grass trimmer 100 by loosely fastening the attaching rod 20 to the clamp plates 30, 35 using the bolts 80, nuts 82, and washers 84; positioning the clamp plates 30, 35 upon opposing sides of the shaft housing 105 of the grass trimmer 100; fastening the clamp plates 30, 35 together using the bolts 80, nuts 82, and washers 84 to encompass the shaft housing 105; positioning and orientating the clamp plates 30, 35 anywhere along the shaft housing 105 at a desired position; tightening all fasteners 80, 82, 84 to clamp the trimmer handle 10 to the shaft housing 105; utilizing the grass trimmer 100 and trimmer handle 10 by hold the shaft housing 105 with one (1) hand, and the trimmer handle 10 with the other; assuming an ergonomic pivoting stance during use to reduce excess pressure on back muscles; and, benefiting from improved ergonomic positioning and comfort while grass trimming afforded a user of the present invention 10.

It is understood that although the trimmer handle is suitable as a retrofit device that can be installed upon many makes and models of existing grass trimmers 100, it may also be introduced as standard equipment on new grass trimmers 100.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A trimmer handle, comprising:
   an elongated tubular attachment rod having a length axis, a rod proximate end and a rod distal end, wherein said rod distal end includes first rod holes and second rod holes;
   a first clamp plate having a concave first proximate end extending parallel with said axis, a first distal end, and a partial-cylindrical-shaped first clamping surface disposed between said first proximal end and said first distal end and extending perpendicular to said axis;
   a second clamp plate having a concave second proximate end extending parallel with said axis a second distal end, and a partial-cylindrical-shaped second clamping surface disposed between said second proximal end and said second distal end and extending perpendicular to said axis;
   a unitary hand grip on said rod proximate end having an integral hand guard;
   a first fastener passing through said first rod holes, through said first clamp plate, and through said second clamp plate;
   a second fastener passing through said second rod holes, through said first clamp plate, and through said second clamp plate; and,
   a third fastener attaching said first distal end of said first clamp plate to said second distal end of said second clamp plate;
   wherein said attachment rod is captured in said concavity of said first proximate end and said concavity of said second proximate end; and,
   wherein said first clamp plate and said second clamp plate are adapted to simultaneously attach said attachment rod to a trimmer shaft such that said trimmer shaft extends perpendicular to said attachment rod.

2. The trimmer handle according to claim 1, wherein said hand grip is press fit to said attachment rod.

3. The trimmer handle according to claim 1, wherein said hand grip includes at least one finger relief groove.

4. The trimmer handle according to claim 1, wherein said first clamp plate and said second clamp plate are mirror-imaged elements comprised of stamped metal.

5. The trimmer handle according to claim 4, wherein said first clamp plate partial-cylindrical-shaped clamping surface is configured to clamp around a shaft housing of a trimmer.

6. The trimmer handle according to claim 5, wherein said first fastener includes a bolt, a washer, and a nut.

7. A grass trimmer handle, comprising:
   an elongated tubular attachment rod having a length axis, a rod proximate end and a rod distal end with a first pair of aligned rod holes and second pair of aligned rod holes;

a first clamp plate having a concave first proximate end extending parallel with said axis, a first distal end, and a partial-cylindrical-shaped first clamping surface extending perpendicular to said axis;

a second clamp plate having a concave second proximate end extending parallel with said axis, a second distal end, and a partial-cylindrical-shaped second clamping surface extending perpendicular to said axis;

a unitary soft hand grip having finger relief groove and an integral hand guard, said hand grip press-fit to said rod proximate end;

a first bolt passing through said first pair of aligned rod holes, through said first clamp plate, and through said second clamp plate; and, a second bolt passing through said second pair of aligned rod holes, through said first clamp plate, and through said second clamp plate;

wherein said first bolt and said second bolt attach said first clamp plate and said second clamp plate to said attachment rod;

wherein said attachment rod is captured in said concavity of said first proximate end and said concavity of said second proximate end; and, wherein said first clamp plate and said second clamp plate are adapted to simultaneously attach said attachment rod to a trimmer shaft such that said trimmer shaft extends perpendicular to said attachment rod.

8. The trimmer handle according to claim 7, wherein said first clamp plate and said second clamp plate are mirror-imaged elements comprised of stamped metal.

9. A trimmer, comprising:
a trimmer shaft housing;
an elongated tubular attachment rod having a length axis, a rod proximate end and a rod distal end, wherein said rod distal end includes first rod holes and second rod holes;
a first clamp plate having a concave first proximate end extending parallel with said axis and attached to said attachment rod, a first distal end, and a partial-cylindrical-shaped first clamping surface extending perpendicular to said axis and disposed around said trimmer shaft housing;

a second clamp plate having a concave second proximate end extending parallel with said axis and attached to said attachment rod, a second distal end, and a partial-cylindrical-shaped second clamping surface extending perpendicular to said axis and disposed around said trimmer shaft housing;

a unitary hand grip on said rod proximate end, said hand grip having an integral hand guard;

a first fastener passing through said first rod holes and attaching said first clamp plate and said second clamp plate to said attachment rod;

a second fastener passing through said second rod holes and attaching said first clamp plate and said second clamp plate to said attachment rod; and a third fastener attaching said first distal end of said first clamp plate to said second distal end of said second clamp plate;

wherein said attachment rod is captured in said concavity of said first proximate end and said concavity of said second proximate end; and, wherein said first clamp plate and said second clamp plate are adapted to simultaneously attach said attachment rod to said trimmer shaft housing such that said trimmer shaft extends perpendicular to said attachment rod.

10. The trimmer according to claim 9, wherein said hand grip is press fit to said attachment rod.

11. The trimmer according to claim 9, wherein said hand grip includes at least one finger relief groove.

12. The trimmer according to claim 9, wherein said first clamp plate and said second clamp plate are mirror-imaged elements comprised of stamped metal.

13. The trimmer according to claim 9, wherein said first fastener includes a bolt, a washer, and a nut.

14. The trimmer according to claim 9, wherein said trimmer is a grass trimmer.

15. The trimmer according to claim 9, wherein said trimmer is gas powered.

16. The trimmer according to claim 9, wherein said trimmer is battery powered.

17. The trimmer according to claim 9, wherein said trimmer is electric powered.

* * * * *